INVENTORS
TUNG CHANG CHEN
ROBERT A. TRACY
BY
George Baron
ATTORNEY

INVENTORS
TUNG CHANG CHEN
ROBERT A. TRACY
BY
George Baran
ATTORNEY

*INVENTORS*
TUNG CHANG CHEN
ROBERT A. TRACY
*BY*
ATTORNEY

United States Patent Office 3,102,239
Patented Aug. 27, 1963

3,102,239

COUNTER EMPLOYING QUANTIZING CORE TO SATURATE COUNTING CORE IN DISCRETE STEPS TO EFFECT COUNTDOWN

Tung Chang Chen, Villanova, and Robert A. Tracy, West Chester, Pa., assignors to Burroughs Corporation, Detroit, Mich., a corporation of Michigan Continuation of application Ser. No. 498,257, Mar. 31, 1955. This application Aug. 28, 1962, Ser. No. 221,399

27 Claims. (Cl. 328—40)

This application is a continuation of a co-pending application designated Serial No. 498,257 filed by the same inventors on March 31, 1955, and entitled Magnetic Device, now abandoned.

The invention of this application relates to magnetic storage devices and more particularly to magnetic storage devices capable of being stepped in a plurality of discrete stable steps.

Static magnetic core devices of the conventional type utilize the two retentivity points of a magnetic core as the two stable states of said core, namely, one having a positive remanent state and the other a negative remanent state. Suitable interrogation means are applied to such a conventional type magnetic core in order to determine its remanence history, e.g., whether the core is in a negative or a positive remanent condition. In logic and arithmetic operations, therefore, at least one of these conventional cores is required for each binary digit.

It is desirable to be able to employ a single core that can be stepped to a plurality of remanent stable state so that one can reduce the number of cores and their associated components in performing logic or arithmetic. Moreover, by increasing the number of discrete remanent states in which a core can be placed, one is not restricted in system design to a binary code. One may step a core into enough discrete remanent states so that the multi-stable magnetic core can produce a carry output when the multi-stable state device has reached its fourth, fifth, sixth or *n*th stable state. Certain advantages of a multi-stable core are set out in an article by Goodell et al. in the December 1951, issue of Radio-Electronics Engineering called "Multi-Stable Memory Techniques."

It is known that when a series of pulses each of a magnetomotive force (M.M.F) greater than the coercive force of a magnetic core but of an insufficient time duration to completely switch the core are applied to a magnetic core which exhibits a rectangular hysteresis loop, and which is at a boundary retentivity point of said hysteresis loop, the magnetic induction increases in steps through a plurality of intermediate remanence points until the other boundary retentivity point is reached. However, the number of steps required to change the magnetic induction from one boundary or limit remanent point to the other is dependent on the magnitude of the applied M.M.F. pulses. Moreover, so long as a multi-stable magnetic core is dependent on the magnitude of the input pulses to set the core into discrete stable states, it will not make a reliable counter.

In order to attain a multi-stable state core that can be used as a reliable counter, it is necessary to overcome the amplitude-sensitiveness of the multi-stable core. This invention solves the problem by using a combination of two cores. Thus, a quantizing core is used in addition to the multi-stable magnetic core. The quantizing core is designed so that it is switched completely from one retentivity point to saturation in the opposite direction for each signal pulse applied to said core. Retentivity of a core is the flux density in the core on removal of the field necessary to cause saturation induction. Such a core because it has a rectangular hysteresis loop, presents a fixed change of flux linkage and hence an output pulse having a fixed volt-second integral for each signal pulse that switches the quantizing core. Thus the output of the quantizing core is fixed and independent of the amplitude of the signal pulse that switches said core as long as the signal amplitude reaches the minimum value necessary to cause complete switching of the core. The multi-stable or counting core, also having a rectangular hysteresis loop, is driven by the output pulse from the quantizing core and has its magnetization increased by a definite reproducible amount each time the quantizing core switches.

When the counting core reaches its saturation and relaxes to its last stable state, the next output signal from the quantizing core causes a reset of the counting core to its initial boundary or retentivity condition. This resetting of the count core is achieved, according to one feature of the present invention, by means of a series voltage dropping impedance connected to the input winding on the count core and to the input circuit of an amplifier device. When the count core saturates, its input winding ceases to exhibit a high impedance and, therefore, the next voltage signal applied will appear largely across the series-connected voltage dropping impedance to trigger the amplifying device. Current flow through the amplifying device also flows through a reset winding on the count core to reset the count core. Also, the reset winding is preferably coupled regeneratively to the input winding, or another winding in the input circuit of the amplifier device, to achieve blocking oscillator operation and rapid resetting of the count core.

In another aspect of the present invention, resetting of the count core is achieved by means of bucking windings in which the voltage developed in two windings, one on the quantizing core and one on the count core, are combined in opposition. These voltages serve to cancel one another while the count core is stepping, but produce a net voltage signal when the stepping of the count core has been completed so that no further flux change occurs in this core in response to voltage signals received from the quantizing core. The output pulse of the bucking winding circuit is coupled either to a vacuum tube reset circuit or to a third magnetic core which is subsequently reset in order to reset the count core.

An output pulse is obtained from the counting core when said core is reset and may be used to drive another core. The output pulse is representative of the number of times the multi-stable core was stepped prior to its resetting and as such may be employed in a logic or computing circuit.

Consequently, it is an object of this invention to provide novel and improved counter systems including a multi-stable state magnetic core.

A further object is to provide a stable and reliable energy source for switching a multi-stable magnetic device so that the latter will be stepped in discrete reproducible intervals.

Yet another object is to provide improved means for effecting the transfer of energy from one quantizing magnetic core to a further multi-stable magnetic core.

Another object of the invention is to provide an improved reset circuit for a magnetic core.

A still further object is to provide simplified yet accurate means for resetting a multi-stable state magnetic element after being driven to full count by a quantizing magnetic core.

A further object is to provide means for stepping and resetting a multi-stable element yet safeguard against the transmission of spurious signals from the multi-stable element back toward the stepping and resetting means during the stepping or resetting process.

Other objects and features of advantage of the present invention will be found throughout the following description of the invention, particularly when considered with the accompanying drawings in which like reference characters refer to similar elements.

Figure 2:
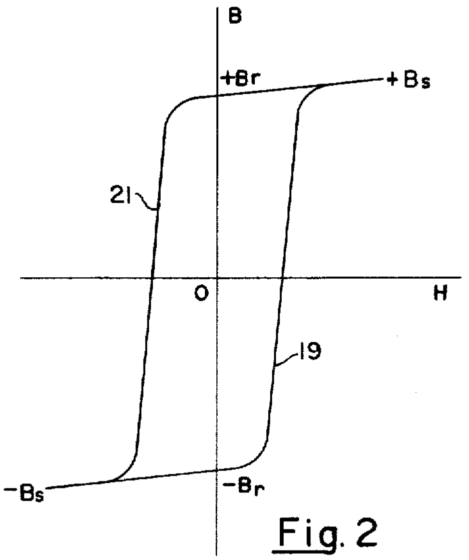
FIGURE 2 is a typical hysteresis loop indicating bistable operation of a magnetic element.
Figure 1:
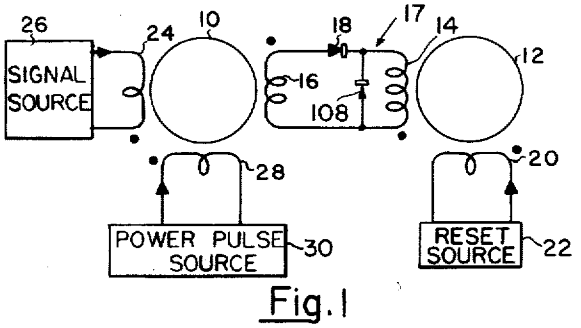
FIGURE 1 is a schematic representation of a circuit embodiment of the invention employing a quantizing core as the driver for a multi-stable state element.

FIGURE 1 shows a basic circuit configuration of the multi-stable step counter. A multi-stable state operated core 12 is driven by a quantizing core 10 through a transfer loop 17 consisting of an output winding 16 coupled to the quantizing core 10, a series diode 18, and an input winding 14 coupled to the multistable state counter core 12. It is assumed that both the quantizing core 10 and multi-stable counter core 12 are initially at their negative retentivity points $-B_r$ depicted in FIGURES 2 and 3. Power, or reset pulses, for the quantizing core 10 are transmitted to reset winding 28 to cause current flow therein in the direction of the arrow from a pulse source 30. By definition current entering the dotted terminal of reset winding 28 causes the core to go to the $-B_r$ state. Signal pulses cause current to enter the storage winding 24 from the signal source 26 in the direction of the arrow shown. The polarity of the signal pulses, as designated by the arrow entering the undotted terminal of winding 24, is such as to tend to drive the quantizing core 10 in the direction of $+B_s$. The signal pulse from source 26 is of sufficient amplitude and duration to switch the quantizing core 10 from its $-B_r$ state to $+B_s$, from which the core returns to its retentivity state $+B_r$. The voltage induced in output winding 16 by switching of the core in response to the signal pulses at winding 24 is in such a direction that the coupling diode 18 is not conducting and the counter core 12 is not caused to switch from one of its multiple states to another. The induced voltage at winding 16 when core 10 goes from $+B_s$ to $+B_r$ is in the forward direction of the coupling diode 18, but its magnitude will be very low for a core having high squareness and therefore may be neglected. The power pulse from source 30 follows the signal pulse from source 26 in time sequence and serves to switch the quantizing core 10 from the $+B_r$ to the $-B_r$ state, thereby resetting the quantizing core for a further signal pulse. The voltage induced in output winding 16 by switching from the $+B_r$ state to the $-B_r$ state in response to the power pulse causes current to flow in the forward direction of diode 18 and therefore current flows in the input winding 14 of the counting core 12. Since the current enters the undotted terminal of input winding 14 it will tend to drive the core toward the $+B_r$ condition.

It can be shown that if the cores 10 and 12 have the same magnetic material, then the relation between the flux changes in the two cores 10 and 12 can be expressed as $$\int_0^T e dt = (B_r + B_s) N_1 A_1 = (B_{r_n} - (B_{r_{n-1}}) N_2 A_2$$

which is termed Equation 1, where $N_1$ is the number of ampere-turns in output winding 16, $A_1$ is the cross-sectional area of the quantizing core 10, $N_2$ is the number of ampere-turns in input winding 14 and $A_2$ is the cross-sectional area of the counter core 12, $B_r + B_s$ is the amplitude of the switching flux linking the quantizing core 10 with its associated output winding, and $B_{r_n} - B_{r_{n-1}}$ is the amplitude of the input signal flux linking the counting core 12 with its associated input winding 14. When the quantizing core 10 initially switches from magnetic remanent point $+B_r$ toward point $-B_s$, the counter core 12 advances one quantum to point $B_1$. The number of quantum steps $n$ required for core 12 to reach saturation can be expressed as $$n = \frac{B_s + B_r}{B_{r_n} - B_{r_{n-1}}} = \frac{N_2 A_2}{N_1 A_1}$$

which is termed Equation 2, assuming that the remanence points $B_{r_1}$, $B_{r_2}$, etc. are equal to $B_1$, $B_2$, etc. respectively. This applies where cores having high squareness ratios are used, and the drop-back $B_1 - B_{r_1}$ produces a negligible change in flux.

It is noted from Equation 1 that the voltage integral is equal to the change of flux linkage and is independent of the waveform and amplitude of the voltage. As long as the quantizing core 10 is driven to saturation by either the signal pulse or the power pulse, the path $-B_s$ to $+B_s$ (called $\Delta B$) along curves 19 or 21 is a constant. In other words, when the quantizing core 10 has a substantially rectangular hysteresis characteristic, the integral $$\int_0^T e dt = K \Delta B$$

where $\Delta B$ is the change in flux in going from $-B_s$ to $+B_s$ along curve 19 or vice versa along curve 21, states that a constant quantum of flux change and hence a fixed volt-second integral output pulse is produced when quantizing core 10 switches. As long as the signal pulse from source 26 supplies that minimum energy necessary to drive quantizing core 10 to the saturation point $+B_s$ of the rectangular hysteresis loop of FIGURE 2, thereby overcoming the coercive force of the core, the core 10 will fall back to $+B_r$ when said signal pulse is removed. Similarly when quantizing core 10 is driven, by the application of an M.M.F. of an opposite polarity, so that the applied negative field H is sufficient, then quantizing core 10 will switch from positive state $+B_r$ to saturation point $-B_s$, leaving the core at point $-B_r$ when the applied negative field is removed.

In the transfer loop 17 of FIG. 1, the electromotive force (E.M.F.) applied to the input winding 14 is equal to the E.M.F. induced in the output winding 16 if there is no impedance in the coupling loop and there are no resistances and leakage reactances in windings 14 and 16. Thus the total flux linkage of one core is equal to that of the other regardless of the amplitude of input power pulses. Eddy current and other losses in the counting core 12 and transfer circuit 17 are overcome by the pulses from the power source 30 which drives the quantizing core 10.

In an actual case, the forward resistance of diode 18 is not zero, and the windings 14 and 16 do have resistances and leakage inductances. With the presence of such resistances and reactances in the coupling loop 17 of an actual circuit the E.M.F. applied to winding 14 is no longer equal to the induced E.M.F. of winding 16. The problem which must be solved is to make the operation of the multi-stable core 12 independent of the amplitude of the signal or power pulse that drives the quantizing core 10.

Figure 4:
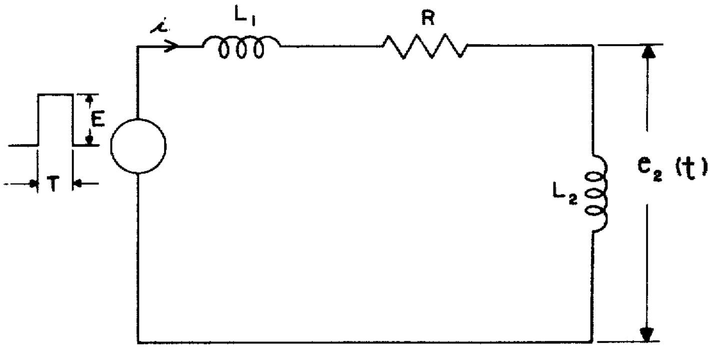
FIGURE 4 is an equivalent circuit of the embodiment illustrated in FIGURE 1.

The circuit of FIGURE 4 represents an equivalent circuit of the one shown in FIGURE 1 wherein T equals the switching time of the quantizing core 10, as may be determined in the manner disclosed in the co-pending United States application S.N. 310,602, filed September 20, 1952, by Lyle Thompson for "Waveform Techniques." In this circuit:

$E$=the voltage induced in winding 16.

$L_1$=the total leakage inductance of the output winding 16, the leakage inductance of winding 14 and any added inductance in loop 17.

$L_2$=the magnetizing inductance (excluding leakage inductance) of winding 14.

$R$=the total resistance of the winding 16, the winding 14, the diode 18, and any added resistance in the coupling loop.

During the switching time T, the quantizing core 10 can be treated as a transformer. The loop equation during the switching time T of core 10 can be written as $$E=(L_1+L_2)\frac{di}{dt}+iR_1 \qquad (3)$$

Solving for $i$, and noting that at $T=0$, $i=0$, one obtains $$i=E/R\left(1-e^{\frac{-Rt}{L_1+L_2}}\right) \qquad (4)$$

Equation 3 can be written as $$L_1i(t)\Big]_0^T+R\int_0^T idt+\int_0^T e_2dt=ET \qquad (5)$$

wherein $$e_2(t)=L_2\frac{di}{dt}$$

Substitute Equation 4 in Equation 5 to obtain $$\frac{L_1E}{R}\left(1-e^{\frac{-RT}{L_1+L_2}}\right)+E\left[TA\left(\frac{L_1+L_2}{R}\right)\left(e^{\frac{-RT}{L_1+L_2}}-1\right)\right]+\int_0^T e_2dt=E \qquad (6)$$

Equation 6, upon simplification, can be written as $$\int_0^T e_2dt=\frac{EL_2}{R}\left(1-e^{-\frac{T}{\frac{L_1+L_2}{R}}}\right)=N_2\Delta\phi_c \qquad (7)$$

Where $\Delta\phi_c$ is the flux change in the counting core 12 during switching of the quantizing core 10.

In order to obtain a flux change that is independent of E and T, $N_2\Delta\phi_c$ must be constant. The term $$\frac{L_1+L_2}{R}$$

may be considered the time constant of the transfer loop. If the switching time T of the quantizing core 10 is made less than the time constant of the transfer loop, expressed as $$T\ll\frac{L_1+L_2}{R}$$

then Equation 7 can be written as $$N_2\Delta\phi_c=\left(\frac{EL_2}{R}\right)\left(\frac{T}{\frac{L_1+L_2}{R}}\right)=ET\left(\frac{L_2}{L_1+L_2}\right) \qquad (8)$$

Since $ET=N_1(\phi_r+\phi_s)$ (10), where $(\phi_r+\phi_s)$ is the change of flux of quantizing core 10 during switching, it follows that $$N_2\Delta\phi_c=\frac{L_2}{L_1+L_2}N_1\phi_2+\phi_s) \qquad (9)$$

Thus, as seen from Equations 2 and 9, the number of steps $n$ for the counting core 12 to reach saturation (which is one less than the actual count of the circuit since it takes an additional pulse to trigger the resetting of the count core and thus give rise to an output pulse) is $$n=\left(\frac{B_r+B_s}{\Delta\phi_c}\right)A_2=\left(\frac{L_1+L_2}{L_2}\right)\frac{N_2A_2}{N_1A_1} \qquad (10)$$

It is therefore evident that the number of counts is independent of the amplitude and duration of the driving pulses as long as the switching time of the quantizing core 10 is short compared to the time constant of the coupling loop 17. Moreover, the number of counts can be varied by changing the ratio $$\frac{N_1}{N_2}$$

or $$\frac{A_1}{A_2}$$

or by inserting a linear inductance in the transfer loop 17.

The above relationships, Equation 9 and 10 show that if a quantizing core of relatively high squareness ratio is used as a means to step a counter core through its stable states the number of steps required for the counter core to reach saturation is dependent on the turns ratio $$\frac{N_2}{N_1}$$

of the cores and the area ratio of said cores, and is independent of the amplitude and duration of the pulses as long as they serve to switch the quantizing core. When counter core 12 has reached its saturation remanent state $+B_r$, means must be provided to reset the counter core 12 to its negative remanent state in one additional step so that the counter core may be free to operate as a multi-stable memory unit. Thus, each output pulse from the counter core 12, which is obtained when such counter is reset, indicates a total count of $n+1$. In the embodiment of FIGURE 1, winding 20 is provided with a pulse from the reset source 22 to cause enough current to flow into the doted terminal of winding 20 so as to reset count core 12 to its negative retentivity state $-B_r$ in one step.

Certain features of FIGURE 1 will now be elaborated upon since such features are common to other embodiments of the invention hereinafter described. Windings such as windings 20, 24 and 28 are shown as single turn windings. Since the current sent through such windings from the pulses can be varied at will, a single turn is employed to illustrate that one can apply sufficient switching energy to these windings to switch either core 10 or 12 from one retentivity state to another. As before noted, the dot notation signifies that current entering the dotted terminal of an input winding to a core will tend to switch said core to a negative $-B_r$ or "0" state of retentivity. Since the dot notation upon an output winding associated with a core indicates the same winding direction, if the input winding carries a current entering through its dotted terminal to switch said core to its negative remanent state, the output voltage induced in the output winding of the switched core will be such as to cause current flow out of the dotted terminal of said output winding. Similarly, if the current enters the input winding through its undotted terminal to switch a core to its positive $+B_r$ or "1" state of retentivity, the output winding associated with said switched core will have current flow out of the undotted terminal.

The windings 14 and 16 of transfer loop 17 of FIGURE 1 are wound so that there are more turns in winding 14 than there are in winding 16. The voltage induced in output winding 16 upon the switching of quantizing core 10 is represented by the equation $$e_Q = N_{16}\frac{d\phi_Q}{dt}$$

where $N_{16}$ represents the number of turns in winding 16, $$\frac{d\phi_Q}{dt}$$

represents the flux change per unit time produced by the switching of quantizing core 10, and $e_Q$ represents the voltage induced in winding 16 as a result of the switching of quantizing core 10. Similarly, for counting core 12, $$e_c = N_{14}\frac{d\phi_c}{dt}$$

Since $e_Q$ should equal $e_c$, and assuming that the areas of both cores are the same, $$1 = \frac{N_{16}\frac{d\phi_Q}{dt}}{N_{14}\frac{d\phi_Q}{dt}} \qquad (11)$$

Since, for a given time interval, the rate of flux change for the quantizing core 10, $$\frac{d\phi_Q}{dt} = n\frac{d\phi_c}{dt}$$

of the counting core, where $n$ is the number of steps that count core 12 can be stepped, Equation 11 becomes $$1 = \frac{nN_{16}}{N_{14}} \qquad (12)$$

Thus we see that for similar cores of equal area, the number of turns of the output winding 16 of the quantizing core 10 must be $$\frac{1}{n}$$

the number of turns of the input winding 14 of the counter core 12. It is to be understood that differences in core characteristics, core ears, and the like will permit different turn ratios than $$\frac{1}{n}$$

Thus in FIGURE 1, when a switching pulse from source 30 enters winding 28 through its dotted terminal, quantizing core 10 switches to its negative remanent state and and output pulse is obtained in winding 16 causing current flow out of the dot. This current flow, being in the direction of low resistance of diode 18, will enter the undotted terminal of winding 14 to step count core 12 from one to the other of its stable states in the direction of positive retentivity. When it is desired to reset count core 12 to its initial state of negative retentivity $-B_r$, a pulse from source 22 causes current flow into the dotted terminal of winding 20 to switch count core 12 to its $-B_r$ state. Such switching induces a voltage in winding 14 in such a manner as to transmit a current back into winding 16 through its undotted terminal. Such a feedback current is undesirable in that it will tend to put quantizing core 10 into its positive remanent state whereas said core 10 should be maintained in its negative remanent state during resetting of count core 12. However, winding 14 is shunted by diode 108 so that the undesired feedback to winding 16 will not create a sufficient current flow through winding 16 to switch the quantizing core 10.

Figure 5:
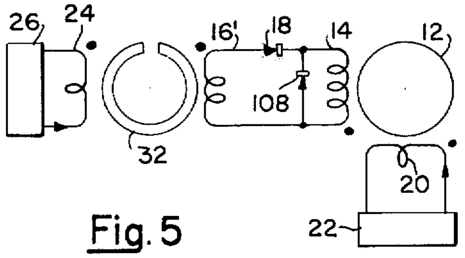
FIGURE 5 is an embodiment of the invention illustrating the manner in which self-resetting of a magnetic core is employed.
Figure 6:
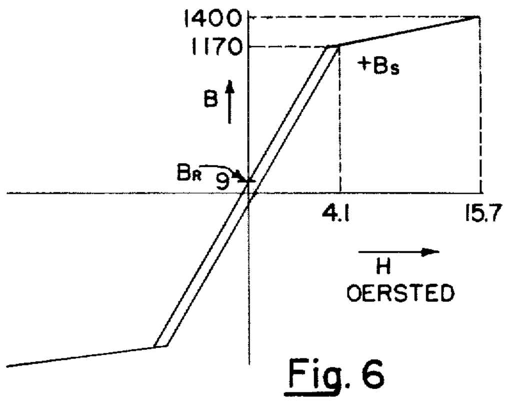
FIGURE 6 is a graphical representation of the hysteresis characteristic presented by the core 32 of FIGURE 5.

Now referring to FIGURE 5, a system for obtaining a quantized input to the count core 12 which eliminates the need for a reset winding for the quantizing core 32 is shown. The elimination of the reset winding allows the counter to accept random or synchronous input signals, since each possible received input pulse position need not be followed by a reset pulse. The general operation of the combination of the quantizing core 32 and the count core 12 is similar to the embodiment described in the illustration of FIGURE 1, but for the modification of the quantizing core which allows it to be asynchronously operated. The quantizing core 32 is constructed by a magnetic material which would normally exhibit a square hysteresis characteristic as illustrated in FIGURE 1. However, the magnetic core 32 in this embodiment has an air gap introduced into it to modify its hysteresis characteristic substantially to that illustrated in FIGURE 6. It should be noted that the introduction of the air gap has so varied the characteristic that the points of magnetic remanence differ largely from the points of saturation. The value of flux density at the saturation point of the core corresponding to $+B_s$ of FIGURE 1 was found to be in the neighborhood of 1170 gauss with a magnetizing field of 4.1 oersteds. To drive the core beyond this point and obtain a significant change of flux density in the neighborhood of 1400 gauss required substantially 15.7 oersteds. Upon the removal of the magnetizing force, the residual magnetism of core 32 dropped to approximately 9 gauss. This hysteresis characteristic was obtained by introducing an air gap of approximately 1/16" in a ferrite magnetic core having a mean diameter of approximately 3/4" and a rige of 3/16" x 1/16" high. The input signal winding 24 is energized by the pulse signal source 26. The output winding 16 of the quantizing core 32 is coupled to the input winding 14 of the count core 12 through the diode 18. Input winding 14 is shunted by the diode 108 to prevent noise transfer back through transfer loop 17 to quantizing core 10 when count core 12 is reset to its $-B_r$ state as hereinbefore explained. The input signal to the winding 24 provides a positive M.M.F. to drive the quantizing core from the point corresponding to the point $+B_r$ in FIGURE 6 with some value of H greater than 4.1 oersteds. The required constant integral of voltage is obtained, at the termination of the input signal when the flux state of the quantizing core 32 returns to the point $+B_r$ thereby dispensing with the need for a resetting means.

Figure 7:
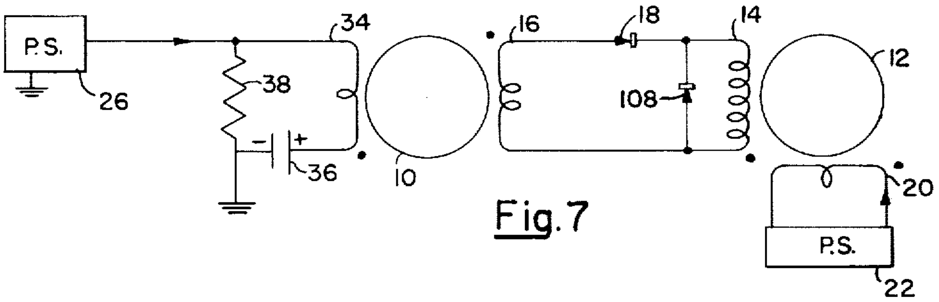
FIGURE 7 is a further embodiment of the invention wherein input signal pulses are used to reset a magnetic core.
Figure 8:
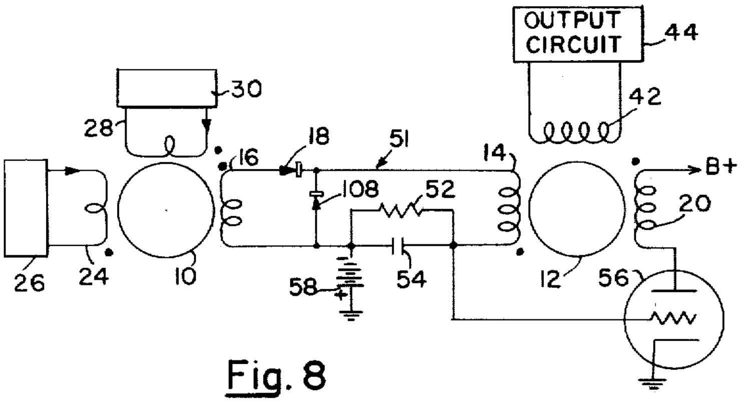
FIGURES 8 through 10 and 12 are further embodiments of the invention illustrating the manner of resetting a multi-stable magnetic element being driven by a quantizing magnetic element.

Now referring to FIGURE 7, asynchronous input circuit, which may be utilized with the quantizing core 10 to step the counting core 12, is shown. The input circuit in this instance utilizes a capacitive reset means in lieu of a separate reset pulse and its attendant circuitry. The input winding 34 to the quantizing core 10 is arranged in series with the capacitive element 36. In parallel with the winding 34 and the capacitor 36 there is provided a resistor 38 having one end terminal connected to the input pulse source 26 and the opposite end terminal connected in common with the remaining end terminal of the capacitor 36 to ground. The output winding of the quantizing core 10 is directly connected to the input winding 14 of the count core 12 by means of the series diode 18. Winding 14 is shunted by diode 108. It is assumed by the dot notation that the pulse provided by the source 26 causes current to pass through the winding 34 in such a direction as to switch the quantizing core 10 towards its positive state of remanence. The presence of the input signal to the quantizing core 10 places such core 10 in a state of saturation. As a consequence of this saturation, the impedance of the input winding 34 is relatively low, permitting the capacitor 36 to become charged to the full amplitude of the pulse from source 26. Upon termination of such pulse, the capacitor 36 discharges through the winding 34 and back through the resistor 38. The discharge current is propotioned to be of sufficient amplitude to reset the quantizing core 10 to its original "0" state of retentivity, and to provide an output signal from winding 16 in the manner hereinbefore described. If it be desired to reverse the polarity of the signal input winding 34, the output signal at winding 16 may be produced during the presence of the input pulse from source 26.

Figure 3:
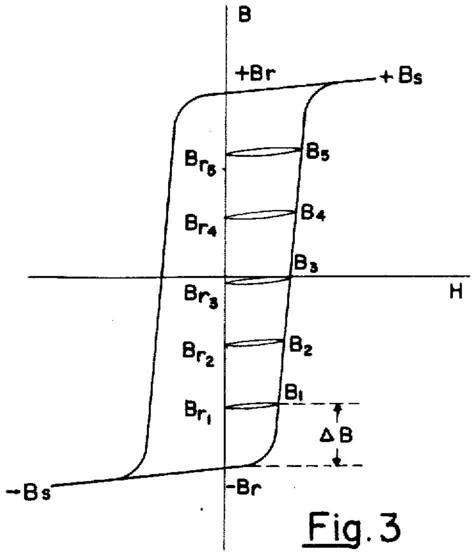
FIGURE 3 is a typical hysteresis loop indicating multistable operation of a magnetic element.

When the magnetic counting core 12 is stepped between its end positions in a discrete number of steps, it is desirable to adapt the stepping process if the counting core to a counting system wherein one can detect the arrival of the counting core at its state of retentivity and then automatically reset the core back to its original state of retentivity for the succeeding stepping cycle. The problems involved in detecting the retentivity state of the counting core and resetting said core have been solved through the use of the systems shown in FIGURES 8–11 inclusive. The means for retentivity detection may require an extra input pulse or count to be provided for the sole purpose of detecting the residual state of the counting core. In such cases, as mentioned above, the count read out of the counting core in response to the reset signal will be equal to $n+1$, where $n$ is the total number of steps between positive and negative retentivity. The hysteresis loop characteristic of the count core will be assumed to have a square loop characteristic as illustrated in FIGURE 3.

When the count core 12 has reached its saturated state of magnetism, there will be no significant change in the flux coupling said count core with its output winding even though current is sent through the input winding associated with said count core. Since the coupling circuit between the quantizing core and the count core may be one of very low impedance, this low impedance acts as a load on the count core during the reset operation and thereby causes the switching time to be very long with a lower power reset pulse. To remove the requirement for a very large power source for the reset pulse the count core is decoupled from the quantizing core during this reset operation, as is described in connection with the embodiment of FIGURE 8. The schematic representation of the circuit for decoupling the count core 12 from the quantizing core 10 during the resetting of count core 12 comprises the resistor 52 and capacitor 54.

A signal pulse from source 26 enters the undotted terminal of winding 24 to shift quantizing core 10 into its positive remanent state. The voltage induced in the transfer loop 51 during such shift would be such as to cause current flow out of the undotted terminal of winding 16, such current being opposite the normal current flow through diode 18 and ineffective to step count core 12. When a pulse from source 30 causes current flow through the dotted terminal of winding 28, quantizing core 10 is driven towards its negative saturation state and an output voltage is obtained in winding 16 such that current now flows in the transfer loop in the direction of current flow through diode 18. Count core 12 is stepped by attendant current flow through input winding 14 to its next discrete stable state toward positive saturation.

During the stepping of count core 12 as a consequence of the switching of quantizing core 10 upon the application of a pulse from source 30 through the dotted terminal of winding 28, the winding 14 maintains most of the quanta of voltage across it that was developed across winding 16 during such switching. Relatively little voltage is developed across resistor 52 because of the bypass capacitor 54, which has a low pulse impedance as compared to the unsaturated impedance of winding 14. When count core 12 has been stepped to its positive retentivity state, represented by point $+B_r$ of FIGURE 3, the very next output voltage pulse appearing across winding 16 as a consequence of the switching of quantizing core 10 from its positive retentivity state to its negative retentivity state will look into a low saturated impedance of winding 14. The current flowing in transfer loop 51 will therefore cause a relatively large voltage drop across resistor 52. This voltage drop is sufficient to make the bias on the grid of tube 56, as supplied by battery 58, less negative, allowing for tube 56 to conduct. The tube could obviously comprise a transistor or other amplifier element, if desirable. The conduction of tube 56 results in current flow into the dotted terminal of winding 20 to reset count core 12 toward its negative saturation state represented by $-B_s$ of FIGURE 3. While count core 12 is being reset by the firing of tube 56, a voltage is induced in winding 14 such that current flow through resistor 52 and diode 108 is in the same direction as that which tends to decrease the negative bias on the grid of tube 56. Hence the resetting of core 12 enhances the conduction of tube 56 to produce a regenerative action assuring the completion of the resetting process. When count core 12 has been completely reset, no further voltage is induced in winding 14, the biasing potential applied to the grid of tube 56 from battery 58 prevails, and tube 56 stops conducting. By means of output winding 42 upon counter core 12, an output signal is generated at output circuit 44 only during reset. The output signal is indicative of a count of $n+1$ steps for which the counter is designed. By means of the regenerative action an output signal is therefore obtained from core 12 without providing a pulsed current source. The counter core 12 therefore may be used to drive several circuits or a power consuming load circuit from energy derived from a direct current $+B$ supply terminal.

Figure 9:
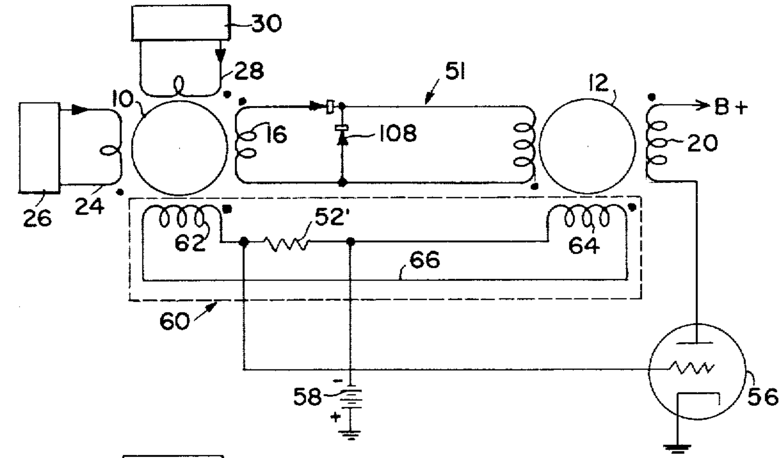

Now referring to FIG. 9, a further system for detecting the arrival of the count core at its retentivity state is shown in combination with a triggering vacuum tube for resetting the count core. In this embodiment a comparision loop 60 is enclosed in the dotted outline. This comparison loop is utilized to trigger the normally biased amplifier tube 56. The anode of the tube 56 is connected to the positive terminal B+ of the power supply in series with the reset winding 20 of the count core 12. The cathode is directly connected to ground or the negative side of the power supply. The comparison loop consists in this instance of a winding 62 coupled to the quantizing core 10, a winding 64 coupled to the count core 12 and a resistor 52', said windings 62 and 64 being in the same series circuit as resistor 52'. The windings 62 and 64 each have one end terminal thereof directly connected to the lead 66. The opposite end terminals of the windings 62 and 64 are connected together by means of the grid resistor 52'. The grid of the vacuum tube 56 is connected to a point common to one end terminal of the resistor 52' and the remaining end terminal of the winding 62, and a biasing source or battery 58' has its negative pole connected to a point common to the biasing resistor 52' and the remaining end terminal of the winding 64. The positive pole of the battery 58' is connected directly to ground. The principle of operation of the comparison loop 60 depends on the fact that there is no flux change in the count core 12 once it has reached its saturation residual or retentivity level $+B_r$. The detection of this "no flux change" condition is made by comparing such "no flux" signal with another signal source which, in this instance, is the signal produced by the switching of quantizing core 10. Therefore, the output pulse produced in the winding 62 of the quantizing core 10 is compared with the output pulse produced in the winding 64 of the count core 12. It may be readily appreciated that when the quantizing core 10 is switched and the count core 12 is stepped, the output pulses produced in winding 62 and winding 64 may be made of equal amplitudes but in opposition in the comparison loop 60, so that little current flows through the grid resistor 52' to overcome the cut-off bias of tube 56. However, once the count core 12 has reached its retentivity state, no flux change will occur in this core upon the next switching of quantizing core 10 and therefore the output pulse produced at winding 64 will be zero or negligible for a "square" core and the voltage generated across the winding 62 is applied across the biasing resistor 52'. The voltage across resistor 52' is of sufficient amplitude to drive the grid bias above the cutoff potential and thereby allow the tube 56 to conduct. The conduction of the tube 56 triggers the reset winding 20 and, as in the previous embodiment of FIGURE 9, provides the positive feedback action in winding 64 aiding the resetting of the counting core 12. These embodiments for detecting the "no flux" condition may suggest to those skilled in the art other circuit configurations which do not depart from the spirit of the invention.

Figure 10:
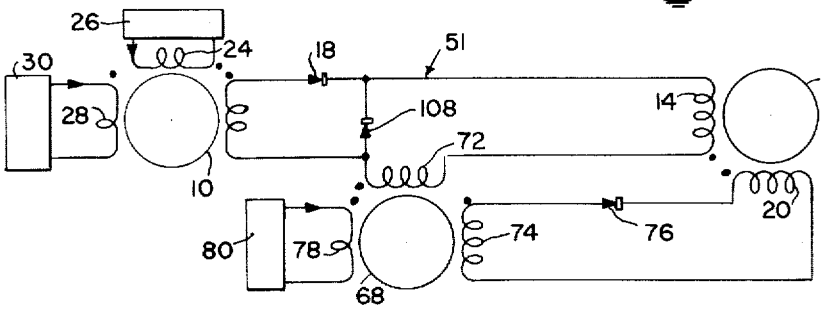

Now referring to FIGURE 10, there is shown a system for resetting the counting core 12 by means of another magnetic core 68 also characterized by a square loop characteristic and utilized as the triggering source. The general scheme in this type of reset is similar to the type utilizing a vacuum tube as the pulse source, that is, detecting the arrival of the count core at its end point or retentivity state and then resetting the count core 12 to its starting point or opposite retentivity state. The cathode of the shunt diode 108 connected in the transfer loop 51 is in common with the cathode of the diode 18, while the anode is connected to a point common to the undotted end terminal of the winding 16 associated with the quantizing core 10 and the dotted end of a detection winding 72 coupled to the reset core 68. The detection winding 72 is connected in a series relationship in the coupling loop having its undotted end terminal connected in common with the dotted terminal of input winding 14 on the counting core 12. A second or transfer winding 74 is also magnetically coupled to the reset core 68 and supplies the input energy to the reset winding 20 coupled to the count core 12 by means of a series diode 76. The series diode 76 is poled in the coupling loop to allow voltage induced in winding 74 when core 78 is being reset by pulse source 80 to be impressed across the reset winding 20 but to prevent voltage induced in winding 20 from reaching winding 74. Also, the diode 76 prevents the energy generated in the winding 74 from being coupled to the count core when the core 68 is itself being set by current flow through winding 72.

To provide the reset for the core 68 there is magnetically coupled thereto a reset winding 78. The source 80 is connected to the reset winding 78 to pass current into the dotted terminal and thus switches the core 68 to the "0" state of retentivity. This is opposite to the "1" state in which the current into the undotted terminal of winding 72 tends to put core 68. The source 80 may be of a synchronous nature. If so, there must be some time relationship between the input pulses delivered by the pulse source 80 to the reset core 68, those pulses provided by the pulse source 30 for resetting the quantizing core 10 and in turn the count core 12, and the signal pulses from source 26 which drive the quantizing core 10. The groups of pulses from reset sources 30 and 80 are interlaced, as may be seen by reference to the graphical representation illustrated in the chart of FIGURE 11. The pulses delivered by the source 30 are impressed on the winding 28 at intervals corresponding to the period $T_2$ on the chart and the pulses provided by the source 80 occur at the interspersed intervals corresponding to the period $T_1$. Accordingly each period $T_2$ occurs at a time later than a previous $T_1$ period. The input signal pulses coupled to the quantizing core 10 from the source 26 to the winding 24 may also occur at intervals corresponding to the periods $T_1$.

Once again the fact that the remanent state of the counting core 12 is below saturation during the stepping process which causes the winding 14 to appear as a high impedance is taken advantage of to limit the current in the coupling circuit 51 to a value which will not allow the reset core 68 to be switched.

Also, upon completion of the stepping process, the impedance of the winding 14 at the retentivity state becomes very low and allows a large current to flow in the coupling circuit 51 which in combination with the correct number of turns on winding 72 is sufficient to provide the required M.M.F. to completely switch the reset core 68. Thereafter an input pulse from source 80 to the winding 78 resets core 68 and this resetting of core 68 by source 80 generates an output voltage in the winding 74 which is coupled to the reset winding 20 by diode 76 to provide the desired switching of the count core 12 back to its original "0" state. The shunt diode 108, provides a path for the circulating current in the transistor loop 51 which disadvantageously couples the counter core 12 to winding 72 during the resetting of counter core 12 by the resetting of reset core 68, thereby requiring that winding 74 have more turns than winding 72 to assure proper reset of the count core 12.

Figures 11, 12:
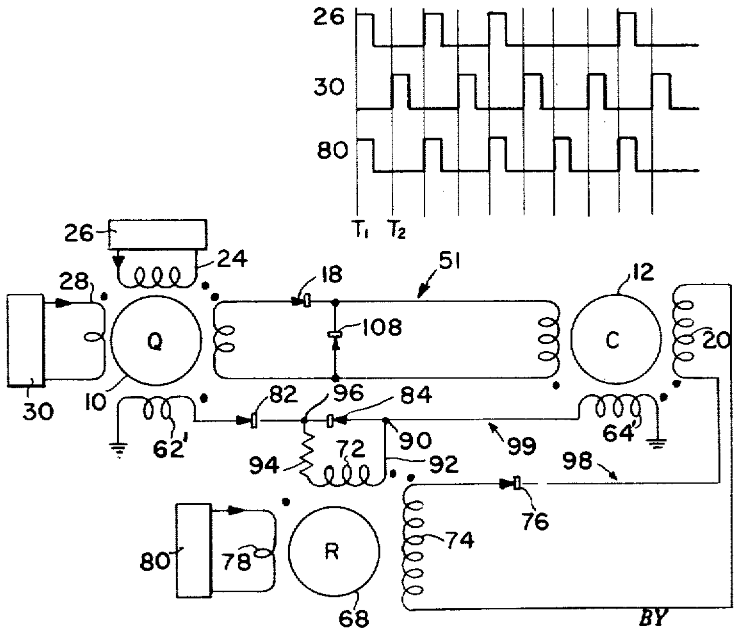
FIGURE 11 is a chart illustrating the time relationships of typical electrical pulses utilized in operating the various embodiments of the instant invention.

Now referring to FIGURE 12, another system for utilizing a magnetic core for resetting the counting core 12 in combination with the comparison system for detecting the residual or retentivity state of the count core 12 will be described. The general operation of the circuit configuration of FIGURE 12 to effect resetting is similar to those embodiments hereinabove described.

The quantizing core 10 is provided with a comparison winding 62' substantially similar to the winding 64' provided for the counting core 12, each coupled to their respective cores in a manner similar to that of the corresponding windings in FIGURE 9. The two windings 62' and 64' each have one end terminal connected to a common ground, and two diodes 82 and 84, oppositely polarized, are inserted between said two windings. Emanating from point 90 coupled to the undotted end of winding 64' is lead 92, the dotted end of inductive winding 72 on reset core 68, and resistance 94, terminating at the common cathode point 96 of diodes 82 and 84. The dotted end of winding 62' is coupled to the anode of diode 82. Assuming that the voltages generated in the windings 62' and 64' during the stepping process are of the same magnitude as performed when more turns exist on winding 64' than winding 62', there is no current flowing in the comparison loop including windings 62' and 64' during the stepping intervals. The diode 82 is connected in the direction to allow current flow in the winding 72 of the comparison loop 99 solely as a result of the potential generated in the winding 62' in the absence of a potential at the winding 64'. The detection winding 72 for the reset core 68 is connected in a parallel relationship with the diode 84. This arrangement allows the current to flow away from the end terminal of the winding 62' marked with a dot through the diode 82 and into the undotted terminals of the windings 72 and 64' and back to the originating source, through winding 64' and ground. It should be noted that this current generates sufficient M.M.F. to switch the core 68, but it is not this switching operation which is effective to reset the count core 12. This switching operation merely positions the core 68 in the proper state of positive magnetic retentivity so that an input pulse from source 80 to the winding 78 coupled to the reset core 68 will reset core 68 so as to provide the correct polarity of resetting potential across winding 74 to reset the count core 12 as in the embodiment of FIGURE 10.

It is necessary to reset the count core 12 in the aforementioned manner since during the step that the retentivity state of the count core 12 is being detected, there is a changing flux induced in winding 72 as a result of the quantizing core 10 attempting to drive the core 12 through transfer loop 51. If the energy provided by the winding 72 in switching the core 68 were utilized to reset the count core 12 at this particular instance, such energy would be attempting to drive the count core 12 in a direction opposite to the direction that it is being driven by the output pulse from the quantizing core 10; the two would cancel one another and thereby prevent the resetting of the core 12. The energy provided by the detection winding 72 is decoupled from the count core 12 by means of the series diode 76 arranged in a series relationship within the transfer loop 98 between the winding 74 of the core 68 and the winding 20 of core 12. Furthermore, upon resetting of the core 68 by means of the current flow in the winding 78 from source 80, the diode 84, which is connected across the winding 72, decouples loop 99 during the resetting operation and thereby prevents feedback voltage from being coupled to the count core 12 to oppose the resetting operation. The diode 84 is arranged to provide a low impedance path across the winding 72 for the feedback voltage and the resistor 94 of small ohmic value is optionally inserted in series with the winding 72 if it is desirable to shorten the switching time of the resetting core 68 by limiting the load current. The pulse source 80 in this instance is synchronized in the same general relationship with sources 30 and 26 as indicated by the graphical illustration in FIGURE 11.

It is seen from the foregoing description of the invention and its mode of operation that improved counting means is afforded for obtaining discrete reproducible increments of storage states in a multi-stable core by employing a quantizing core that, upon switching, will yield a substantially constant flux, said constant flux being available as switching energy for the multi-stable core. Moreover, efficient and reliable transfer loops are provided to effectuate the transfer of energy derived from the switching of the quantizing core to a counting core. These novel features believed descriptive of the nature and scope of the invention are defined with particularity in the appended claims.

What is claimed is:

1. A binary magnetic core and a multi-stable magnetic core having *n* stable states of remanence wherein its first and *n*th states are its retentivity states, an output winding on said binary core and an input winding on said multi-stable core, a unidirectional transfer loop coupling such windings of said cores to effectuate the stepping of said multi-stable core into discrete reproducible states of magnetic storage upon the switching of said binary core from one remanent state to its other remanent state, a capacitor coupled in series circuit in said transfer loop, a resistor in parallel with said capacitor, and means responsive to a high potential at said resistor for resetting said multi-stable core whereby it is automatically reset upon reaching that retentivity point opposite to its initial retentivity point.

2. A binary magnetic core and a multi-stable magnetic core having *n* stable states of remanence wherein its first and *n*th states are its retentivity states, a transfer loop having an impedance element therein and coupling said cores to effectuate the stepping of said multi-stable core into discrete reproducible states of magnetic storage upon the switching of said binary core from one remanent state to its other remanent state, an amplifier having an input and output circuit, an inductance winding in the transfer loop in said amplifier input circuit and associated with said multi-stable core, a capacitor in said transfer loop, a resistor in parallel with said capacitor, means for applying a potential through said resistor to bias said input circuit so as to render said amplifier non-conducting during the progressive stepping of said multi-stable magnetic core from its initial retentivity state to its other retentivity state, and circuit parameters of such value that when the multi-stable state core reaches saturation state causing the inductance winding to appear as a low impedance in said transfer loop, the subsequent switching of said binary core will cause an increased potential drop across said resistor to remove cut-off bias from said amplifier and render it conducting, and further winding means on said multi-stable core utilizing the current through said amplifier to reset said multi-stable core to its initial state, whereby the amplifier regeneratively switches the core.

3. In a magnetic system comprising, a magnetic core capable of multi-stable operation having *n* stable states of magnetic remanence wherein *n* is greater than two and the first and *n*th states are the limit states of magnetic remanence, an input winding magnetically coupled to the magnetic core, means for coupling to the input winding an electrical signal for developing in said core a quanta of flux representative of the voltage-time integral required to step the magnetization of the core a discrete step from one to another stable state of magnetization in the direction of the *n*th state, a reset winding magnetically coupled to the magnetic core, a normally disabled electrical source connected to the reset winding, and an impedance means connected in series with the input winding of the magnetic core for developing, in response to the application of the electrical signal following that which drives the flux level of said core to its *n*th limit state, a signal for activating said normally disabled electrical source connected to said reset winding, thereby to reset said core.

4. A counter circuit comprising; a magnetic quantizing core capable of assuming either of two stable states of magnetic remanence, one of which is a reference state; means for switching said quantizing core from its reference state to its other state; means for resetting said quantizing core to its reference state; output means coupled to said quantizing core and responsive to each switching of said core to its said other state for developing a signal having a substantially constant volt-time integral; a magnetic count core capable of being switched from a reference limit state of magnetic remanence to an opposite limit state of magnetic remanence in step-by-step fashion through *n* intermediate stable magnetic positions; an input winding coupled to said count core; a resistive impedance connected in series with said input winding and forming therewith a voltage divider having a junction at the point of connection of said resistance and said input winding; a reset winding coupled to said count core; an amplifier device having input-circuit and output-circuit electrodes; means for connecting said count-core reset winding in the output circuit of said amplifier device; means, including a source of biasing voltage, for connecting said resistive impedance across the input-circuit electrodes of said amplifier device for biasing said device into non-conduction; and means for applying said signals of substantially constant volt-time integral across said voltage divider for driving, in response to each signal, a current pulse through said voltage divider, the current pulse through said input winding being effective to exert a magnetizing force on said count core of a value to switch said count core through one of said steps, the current pulse through said resistive impedance applying to the input-circuit electrodes of said amplifier a voltage of a polarity to oppose said biasing voltage, said applied opposing voltage being insufficient to override said biasing voltage so long as said input winding exhibits relatively high impedance due to said count core switching through one of said steps, said applied opposing voltage being adequate to override said biasing voltage and to drive said amplifier device into conduction when said input winding exhibits relatively low impedance due to said count core having reached its said opposite limit state of magnetic remanence, said amplifier current flow through said reset winding being effective to reset said count core to its said reference limit state of magnetic remanence.

5. Apparatus as claimed in claim 4 characterized in the provision of an additional winding coupled to said count core and responsive to the said resetting of said count core for developing an $(n+1)$ count signal.

6. Apparatus as claimed in claim 4 characterized in the provision of inhibit means for preventing the voltage induced in said input winding in response to the resetting of said count core from switching said quantizng core.

7. Apparatus as claimed in claim 5 characterized in the provision of inhibit means for preventing the voltage induced in said input winding in response to the resetting of said count core from switching said quantizing core.

8. Apparatus as claimed in claim 4 characterized in that said count-core reset winding is wound in such sense relative to said input winding that in response to the initial flow of amplifier current through said count-core reset winding and the initiation of reset switching a voltage is induced in said input winding of a polarity and magnitude to override said biasing voltage thereby to maintain said amplifier device biased for conduction until said count core has been completely reset.

9. Apparatus as claimed in claim 6 characterized in that said count-core reset winding is wound in such sense relative to said input winding that in response to the initial flow of amplifier current through said count-core reset winding and the initiation of reset switching a voltage is induced in said input winding of a polarity and magnitude to override said biasing voltage, thereby to maintain said amplifier device biased for conduction until said count core has been completely reset.

10. A counter circuit comprising: a magnetic quantizing core capable of assuming either of two stable states of magnetic remanence; a magnetic count core of high magnetic retentivity and capable of being switched from a boundary state of magnetic remanence of reference polarity to a boundary state of opposite polarity in step-by-step manner through *n* intermediate stable magnetic states each corresponding to a different level of flux density; a transfer loop interconnecting said quantizing and count cores, said transfer loop including an output winding coupled to said quantizing core, an input winding coupled to said count core, an asymmetrically conducting device connecting one end of said output winding to one end of said input winding, and a resistance connecting the other end of said output winding to the other end of said input winding; an amplifier device having input-circuit and output-circuit electrodes; means including a source of biasing voltage connecting said resistance across the input-circuit electrodes of said amplifier device for biasing said amplifier device into non-conduction; a reset winding coupled to said count core and included in the output circuit of said amplifier device, said reset winding being wound in such sense as to be regeneratively coupled to said input winding; means responsive to the first of a series of spaced-apart to-be-counted pulses for switching said quantizing core from one to the other of its stable states for inducing a voltage in said quantizing-core output winding to drive a pulse of transfer current around said transfer loop and through said count-core input winding to change the flux density in said count core by one of said steps, thereby in response to said flux change to induce a back voltage in said input winding whereby said input winding exhibits relatively high impedance to said transfer current pulse; means for resetting said quantizing core to said one stable state in preparation for the next pulse to be counted, thereby after a succession of applied to-be-counted pulses and successive switchings of said quantizing core to drive the flux density of said count core to said boundary state of magnetic remanence of said opposite polarity, whereupon, in response to the next pulse of transfer current substantially no back voltage is induced in said input winding and said input winding exhibits relatively low impedance to said pulse of transfer current, whereupon increased current flows through said resistance and the voltage drop thereacross applied to the input-circuit electrodes of said amplifier device is sufficient to overcome said biasing voltage and to drive said amplifier device into conduction, thereby in response to current flow through said reset winding of said count core to induce a voltage in said input winding of a polarity and magnitude to maintain said amplifier device biased for conduction, whereby said amplifier device continues conducting until completion of reset of said count core; and means responsive to the resetting of said count core for developing an $(n+1)$ count signal.

11. Apparatus as claimed in claim 10 characterized in the provision of a second asymmetrical conducting device connected in shunt across said output winding for preventing the switching of said quantizing core in response to the resetting of said count core.

12. A counter circuit comprising: a magnetic core of high magnetic retentivity and capable of being switched from a boundary state of magnetic remanence of reference polarity to a boundary state of opposite polarity in *n* discrete steps where *n* is an integer larger than one; an input winding coupled to said core; a resistance having one end connected to one end of said input winding; an amplifier device having input-circuit and output-circuit electrodes; means, including said resistance, for applying a biasing potential across said input-circuit electrodes for biasing said amplifier device into non-conduction; means for connecting a source of spaced-apart to-be-counted pulses, each of substantially equal volt-time integral, between the other end of said input winding and the other end of said resistance for driving, in response to a pulse to be counted, a current pulse through said input winding and said resistance in series, the current pulse through said input winding being effective to change the flux density in said core through one of said discrete steps, whereby in response to said flux change said input winding exhibits relatively high impedance and relatively small current flows through said resistance but whereby, after a succession of pulses to be counted and a consequent succession of current pulses through said input winding, the flux density of said core reaches said boundary state of magnetic remanence of opposite polarity, whereupon, in response to the next pulse current through said input winding, said input winding exhibits relatively low impedance and relatively large current flows through said resistance and the voltage developed thereacross and applied to the input-circuit electrodes of said amplifier device becomes sufficient to override said bias and to drive said amplifier device into conduction; and a reset winding coupled to said core and included in the output circuit of said amplifier device, said reset winding being regeneratively coupled to said input winding, thereby, in response to amplifier current flow through said reset winding, to induce in said input winding a voltage of a polarity to maintain said amplifier device biased for conduction until said core is reset to said boundary state of reference polarity.

13. Apparatus as claimed in claim 12 characterized in the provision of means responsive to the resetting of said core to said boundary state of reference polarity for developing an $(n+1)$ count signal.

14. A counter circuit comprising: a magnetic core of high magnetic retentivity and capable of being switched from a boundary state of magnetic remanence of reference polarity to a boundary state of opposite polarity in *n* discrete steps where *n* is an integer larger than one; an input winding coupled to said core; an amplifier device having input-circuit and output-circuit electrodes; a resistance having one end connected to one end of said input winding, said resistance being also connected across said input-circuit electrodes of said amplifier device; means for applying a biasing potential across said input-circuit electrodes for biasing said amplifier device normally into non-conduction; means for connecting a source of spaced-apart to-be-counted pulses, each of substantially equal volt-time integral, across a voltage divider comprising said input winding and said resistance in series for driving, in response to a pulse to be counted, a current pulse through said input winding and resistance, the current pulse through said input winding being effective to change the flux density in said core by one of said discrete steps, whereby said input winding exhibits relatively high impedance, but whereupon, after a succession of pulses to be counted and a consequent succession of current pulses through said input winding, the flux density of said core reaches said boundary state of magnetic remanence of opposite polarity, the next pulse current through said input winding causes said input winding to exhibit relatively low impedance and relatively large current flows through said resistance and the voltage developed thereacross and applied to the input-circuit electrodes of said amplifier device becomes sufficient to override said normal bias and drive said amplifier device into conduction; and a reset winding coupled to said core an included in the output circuit of said amplifier device for resetting said core to said boundary state of reference polarity.

15. A counter circuit comprising: a magnetic core of high magnetic retentivity and capable of being switched from a boundary state of magnetic remanence of reference polarity to a boundary state of opposite polarity in $n$ discrete changes of flux level, where $n$ is an integer larger than 1; input winding means coupled to said core; a resistance having one end connected to one end of said input winding means; an amplifier device having input and output circuits, said output circuit including a second winding coupled to said core; means, including a voltage source, connecting said resistance in the input circuit of said amplifier for biasing said amplifier normally beyond cutoff; and means for applying to-be-counted spaced-apart pulses of substantially equal volt-second integral across said input winding means and said resistance in series for driving spaced-apart pulses of current therethrough to change, in response to each current pulse, the flux level of said core by one of said $n$ discrete changes of level, thereby in response to a succession of $n$ such to-be-counted pulses to drive said core from said boundary state of magnetic remanence of reference polarity to said boundary state of opposite polarity, whereupon, in response to the next succeeding pulse of current flow therethrough, substantially negligible back voltage is induced in said input winding means and said next succeeding current pulse develops across said resistance a potential overriding said biasing voltage, thereby to drive said amplifier into conduction and thereby in response to amplifier current flow through said second winding to reset said core to said boundary state of reference polarity.

16. Apparatus as claimed in claim 15 characterized in the provision of means responsive to the resetting of said core to said boundary state of reference polarity for producing an $n+1$ count signal.

17. Apparatus as claimed in claim 15 characterized in that said means for applying to-be-counted spaced-apart pulses of substantially equal volt-second integral across said input winding means includes a magnetic quantizing core capable of assuming either of two stable states of magnetic remanence one of which is a reference state, means for switching said quantizing core from its reference state to its other state, means for resetting said quantizing core to its reference state, and means coupled to said quantizing core and responsive to the switchings of said core to one of its two states for developing said spaced-apart pulses of substantially equal volt-second integral.

18. A blocking oscillator counter stage comprising a pair of input terminals for connection to a source of input pulses to be counted, means connected across said input terminals for deriving across a pair of output terminals a uniform volt-second area output pulse from each of said input pulses, a blocking oscillator including an electron tube having at least a grid, a plate and a cathode, said plate and grid having transformer windings regeneratively coupled therebetween, counting means including a winding on a saturable core connected between one of said output terminals and the grid circuit of said blocking oscillator, said core being composed of a substantially rectangular hysteresis loop material having high magnetic remanence, means connecting the other of said output terminals with the cathode circuit of said blocking oscillator, said uniform volt-second area output pulse having sufficient energy to drive said saturable core over a fixed increment of said hysteresis loop determined by the number of pulses to be counted per stage, whereby after application of said number of pulses said saturable core will saturate and trigger said oscillator, and means for resetting said saturable core after triggering said oscillator.

19. A blocking oscillator counter stage comprising a pair of input terminals for connection to a source of input pulses to be counted, means for deriving a uniform volt-second area output pulse from each of said input pulses including a first saturable core having an input and an output winding wound thereon, a capacitor connected in series with said input winding across said input terminals, said input pulses each having sufficient magnitude to drive said first saturable core from one direction of saturation to the other, said capacitor having sufficient capacitance to reset said first saturable core after termination of each of said input pulses, a blocking oscillator including an electron tube having at least a grid, a plate and a cathode, said plate and grid having transformer windings regeneratively coupled therebetween, counting means including a winding on a second saturable core connected between one terminal of said output winding and the grid circuit of said blocking oscillator, said second saturable core being composed of a substantially rectangular hysteresis loop material having high magnetic remanence, means connecting the other terminal of said output winding with the cathode circuit of said blocking oscillator, said uniform volt-second area output pulse having sufficient energy to drive said second saturable core over a fixed increment of said hysteresis loop determined by the number of pulses to be counted per stage, whereby after application of said number of pulses said second saturable core will saturate and trigger said oscillator, and means for resetting said saturable core after triggering said oscillator.

20. A blocking oscillator counter stage comprising a pair of input terminals for connection to a source of input pulses to be counted, means for deriving a uniform volt-second area output pulse from each of said input pulses including a first saturable core having an input and an output winding wound thereon, a capacitor connected in series with said input winding across said input terminals, each of said input pulses having sufficient magnitude to drive said first core from one direction of saturation to the other, said capacitor having sufficient capacitance to reset said first core after the termination of each of said input pulses, a blocking oscillator including an electron tube having at least a grid, a plate and a cathode, said plate and grid having transformer windings regeneratively coupled therebetween, counting means including a counting winding on a second saturable core of a substantially rectangular hysteresis loop material having high magnetic remanence, a diode connected in series with said counting winding between one terminal of said output winding and the grid circuit of said blocking oscillator, said diode being poled to pass current flowing away from said grid circuit during said resetting of said first core, means connecting the other output terminal of said output winding with the cathode circuit of said blocking oscillator, said uniform volt-second area output pulses having sufficient energy to drive said second saturable core over a fixed increment of said hysteresis loop determined by the number of pulses to be counted per stage, whereby after application of said number of pulses said second saturable core will saturate and trigger said oscillator, and means for resetting said second saturable core after triggering said oscillator.

21. A blocking oscillator counter stage comprising a pair of input terminals for connection to a source of input pulses to be counted, means connected across said input terminals for deriving across a pair of output terminals a uniform volt-second area output pulse from each of said input pulses, a blocking oscillator including an active element having at least an input electrode, an output electrode and a common electrode, said output electrode and input electrode having transformer windings regeneratively coupled therebetween, counting means including a winding on a saturable core connected between one of said output terminals and the input electrode circuit of said blocking oscillator, said core being composed of a substantially rectangular hysteresis loop material having high magnetic remanence, means connecting the other of said output terminals with the common electrode circuit of said blocking oscillator, said uniform volt-second area output pulse having sufficient energy to drive said saturable core over a fixed increment of said hysteresis loop determined by the number of pulses to be counted per stage, whereby after application of said number of pulses said saturable core will saturate and trigger said oscillator, and means for resetting said saturable core after triggering said oscillator.

22. A blocking oscillator counter stage comprising a pair of input terminals for connection to a source of input pulses to be counted, means connected across said input terminals for deriving across a pair of output terminals an output pulse from each of said input pulses wherein any fluctuations in volt-second areas present in the input pulses are reduced, a blocking oscillator including an active element having at least an input electrode, an output electrode and a common electrode, said output electrode and input electrode having transformer windings regeneratively coupled therebetween, counting means including a winding on a saturable core connected between one of said output terminals and the input electrode circuit of said blocking oscillator, said core being composed of a substantially rectangular hysteresis loop material having high magnetic remanence, means connecting the other of said output terminals with the common electrode circuit of said blocking oscillator, said output pulse having sufficient energy to drive said saturable core over a fixed increment of said hysteresis loop determined by the number of pulses to be counted per stage, whereby after application of said number of pulses said saturable core will saturate and trigger said oscillator, and means for resetting said saturable core after triggering said oscillator.

23. A counter stage comprising a pair of input terminals for connection to a source of input pulses to be counted, means connected across said input terminals for deriving across a pair of output terminals a uniform volt-second area output pulse from each of said input pulses, a blocking oscillator including an amplifying device having at least an input, a common and an output electrode, said output and input electrodes having transformer windings regeneratively coupled therebetween, a transfer loop connected to said pair of output terminals including counting means having a winding on a saturable core, said core being composed of a substantially rectangular hysteresis loop material having high magnetic remanence, circuit means coupled to the input electrode of said blocking oscillator and to said transfer loop for providing an electrical triggering signal to said blocking oscillator, said uniform volt-second area output pulse having sufficient energy to drive said saturable core over a fixed increment of said hysteresis loop determined by the number of pulses to be counted per stage, whereby after application of said number of pulses said saturable core will saturate and permit said electrical triggering signal to trigger said oscillator, and means for resetting said saturable core after triggering said oscillator.

24. A counter stage comprising a magnetic core having a first and a second winding, a pair of input terminals connected to said first winding for connection to a source of input pulses to be counted, means for deriving across a pair of output terminals connected to said second winding a uniform volt-second area output pulse from each of said input pulses, a blocking oscillator including an amplifying device having at least an input, a common and an output electrode, said output and input electrodes having transformer windings regeneratively coupled therebetween, a transfer loop connected to said pair of output terminals including a winding on a saturable count core, said transfer loop further including coupling means providing a triggering signal to the input electrode of said amplifying device, said count core being composed of a substantially rectangular hysteresis loop material having high magnetic remanence, means connected between the input and common electrodes of said amplifying device normally maintaining such device nonconducting, said uniform volt-second area output pulse having sufficient energy to drive said count core over a fixed increment of said hysteresis loop determined by the number of pulses to be counted per stage, whereby after application of said number of pulses said count core will saturate and permit said triggering signal to trigger said oscillator, and means for resetting said count core after triggering said oscillator.

25. A magnetic circuit including a count core of magnetic material capable of assuming first and second limiting remanent states of flux orientation in opposite directions and a plurality of remanent states intermediate said limiting states, first winding means magnetically coupled to said core, a transfer loop connected to said first winding means and including first winding means magnetically coupled to a quantizing stage magnetic core capable of assuming either of two stable states of magnetic remanence, one of which is a reference state, second winding means coupled to said quantizing stage magnetic core, means for applying switching signals to said second winding means for driving said quantizing core to said reference state for generating across its first winding means a uniform volt-second area output pulse, said output pulse driving said count core in step by step fashion through said intermediate remanent states towards said second limiting remanent state, further series-bucking winding means magnetically coupled to said respective cores connected to provide voltages in opposition to one another in response to said switching signals so long as said count core is being stepped and to provide an unopposed voltage from the flux switching in the quantizing core when said count core is in said second limiting remanent state, and means associated with said count core for resetting it to said first limiting state when enabled by said unopposed voltage so as to provide an output pulse when said core is reset.

26. A magnetic circuit including a count core of magnetic material capable of assuming first and second limiting remanent states of flux orientation in opposite directions and a plurality of remanent states intermediate said limiting states, first winding means magnetically coupled to said core, a transfer loop connected to said first winding means and including first winding means magnetically coupled to a quantizing stage magnetic core capable of assuming either of two stable states of magnetic remanence, one of which is a reference state, second winding means coupled to said quantizing stage magnetic core, means for applying switching signals to said second winding means for driving said quantizing core to said reference state for generating across its first winding means a uniform volt-second area output pulse, said output pulse driving said count core in step by step fashion through said intermediate remanent states towards said second limiting remanent state, further series-bucking winding means magnetically coupled to said respective cores connected to provide voltages in opposition to one another in response to said switching signals so long as said count core is being stepped and to provide an unopposed voltage when said count core is in said second limiting remanent state, reset winding means magnetically coupled to said count core, and an electronic control device providing a regenerative coupling between said reset winding means and a portion of said series-bucking winding means associated with said count core when said device is enabled by said unopposed voltage, and means associated with said count core for resetting it to said first limiting state when enabled by said unopposed voltage so as to provide an output pulse when said core is reset.

27. A counter stage comprising a pair of input terminals for connection to a source of input pulses to be counted, quantizing means connected across said input terminals for deriving across a pair of output terminals a uniform volt-second area output pulse from each of said input pulses, a blocking oscillator including an amplifying device having at least an input, a common and an output electrode, said output and input electrodes having transformer windings regeneratively coupled therebetween, a transfer loop connected to said pair of output terminals including counting means having a winding on a saturable count core, said core being composed of a substantially rectangular hysteresis loop material having high magnetic remanence, said uniform volt-second area output pulse having sufficient energy to step said saturable count core over a fixed increment of said hysteresis loop determined by the number of pulses to be counted per stage until said count core has reached a limiting remanent state, means coupled to said quantizing means and to said count core connected to provide voltages in opposition to one another in response to said input pulses so long as said count core is being stepped and to provide an unopposed voltage when said count core is in said limiting remanent state, said last-mentioned means being coupled to the input electrode of said amplifying device to supply to said device the difference between said opposing voltages while the count core is being stepped and the unopposed voltage when the count core is in said limiting remanent state, the transformer windings of said blocking oscillator being oriented to reset the count core to a second limiting remanent state when the blocking oscillator is enabled by said unopposed voltage, and means to provide an output pulse when said core is being reset.

No references cited.

UNITED STATES PATENT OFFICE

CERTIFICATE OF CORRECTION

Patent No. 3,102,239 August 27, 1963

Tung Chang Chen et al.

It is hereby certified that error appears in the above numbered patent requiring correction and that the said Letters Patent should read as corrected below.

Column 4, lines 3 to 5, for that portion of the equation reading "$(Br_n-(Br_{n-1})N_2A_2$" read -- $(Br_n-Br_{n-1})N_2A_2$ --; column 5, lines 21 and 22, for the right-hand portion of equation (3) reading "$+iR_1$" read -- $+iR$ --; lines 25 and 26, for that portion of equation (4) reading "-Rt" read -- -RT --; lines 37 to 41, for that portion of equation (6) reading "=E" read -- =ET --; same column 5, lines 74 and 75, the right-hand portion of equation (9) reading "$N_1\phi_2+\phi_s)$" read -- $N_1(\phi_2+\phi_s)$ --; column 22, line 12, strike out "No references cited." and insert instead the following:

References cited in file of the original, parent application

UNITED STATES PATENTS

| | | |
|---|---|---|
| 2,591,406 | Carter et al. | Apr. 1, 1952 |
| 2,704,842 | Goodell et al. | Mar. 22, 1955 |
| 2,708,722 | An Wang | May 17, 1955 |
| 2,753,545 | Lund | July 3, 1956 |
| 2,757,359 | Anderson et al. | July 31, 1956 |
| 2,772,357 | An Wang | Nov. 27, 1956 |

OTHER REFERENCES

"Multi-Stable Magnetic Memory Techniques", Goodell et al, Radio-Electronics Engineering, December, 1951.

"A Magnetic Scaling Circuit", Hellmuth Hertz, published January 1951, Journal App. Physics, Vol. 22, pp. 107-108.

Signed and sealed this 11th day of August 1964.

(SEAL)
Attest:

ERNEST W. SWIDER
Attesting Officer

EDWARD J. BRENNER
Commissioner of Patents